United States Patent [19]
Strand

[11] Patent Number: 5,473,050
[45] Date of Patent: Dec. 5, 1995

[54] DENATURED BOVINE SERUM ALBUMIN MILK PRODUCTS AND METHOD THEREFOR

[75] Inventor: Frederick T. Strand, Phoenix, Ariz.

[73] Assignee: Advanced Nutrition Concepts, Inc., Phoenix, Ariz.

[21] Appl. No.: 134,638

[22] Filed: Oct. 12, 1993

[51] Int. Cl.$^6$ .............................. A23L 3/16; A23J 1/20; A61K 38/38; C07K 14/765

[52] U.S. Cl. ..................... 530/363; 530/360; 530/361; 530/364; 530/427; 426/520; 426/521; 426/522

[58] Field of Search ................................ 426/520, 521, 426/522; 530/360, 361, 363, 364, 427

[56] References Cited

U.S. PATENT DOCUMENTS

| | | | |
|---|---|---|---|
| 1,550,860 | 8/1925 | Wiseman | 426/522 |
| 3,174,866 | 3/1965 | Saperstein | 426/656 |
| 3,567,470 | 3/1971 | McElroy | 426/522 |

OTHER PUBLICATIONS

Hansen et al. "Effect of Temperature & Time of Processing & Storage on Consumer Acceptability of Ultra High Temperature Steam Injected Whole Milk" 1980 J. Dairy Sci 63(2): 187–192.

Parris et al. "Identification of Altered Proteins in Nonfat Dry Milk Powder Prepared from Heat Treated Skim Milk" 1990 J. Agric. Food Chem. 38 824–829.

Lee "Food–Processing Approaches to Altering Allergic Potential of Milk–Based Formula" Nov. 1992. J. Pediatrics 121(Spt2):S47–S50.

"Grade A Pasturized Milk Ordinance", 1989 Revision Part I Section 1 Subsection S Entitled Pasteurization on pp. 4 & 5.

*Primary Examiner*—William H. Beisner
*Assistant Examiner*—Nancy J. Degen
*Attorney, Agent, or Firm*—Harry M. Weiss; Jeffrey D. Moy

[57] ABSTRACT

A method of producing denatured bovine serum albumin (BSA) milk products is disclosed which provides a container for containing the milk products and a source of heating the container for a period of time and within a certain temperature range sufficient for producing the denatured BSA milk products without substantially diminishing either the flavor or the nutritional value of the milk products. It appears that the consumption of denatured BSA milk products, as opposed to consumption of non-denatured BSA milk products, will tend to reduce the likelihood of a person acquiring Insulin Dependent Diabetes Mellitus (IDDM), atherosclerotic vascular disease, myasthenia gravis, multiple sclerosis, pernicious anemia, and other human autoimmune diseases.

9 Claims, 2 Drawing Sheets

5,473,050

DENATURED BOVINE SERUM ALBUMIN MILK PRODUCTS AND METHOD THEREFOR

FIELD OF THE INVENTION

This invention relates generally to milk products and, more specifically, to denatured bovine serum albumin (BSA) milk products and methods therefor which provide unique methods of processing milk products within specific time and temperature ranges in order to denature the BSA found in milk products without substantially diminishing either the flavor or the nutritional content of these milk products.

DESCRIPTION OF THE PRIOR ART

Diabetes mellitus (DM) is one of the most common metabolic diseases. There are two major types of DM, namely insulin-dependent (IDDM) and non-insulin-dependent (NIDDM). IDDM is also called juvenile, brittle, autoimmune, or type I diabetes. Although IDDM comprises approximately only 10% of all cases of DM, IDDM affects children more often than NIDDM, and IDDM is typically more difficult to manage. There are about 300,000 people in the United States with IDDM and nearly 30,000 new cases are diagnosed each year. Most cases of IDDM result from the destruction of insulin producing pancreatic beta cells by a person's immune system. The primary purpose for producing denatured BSA milk products is to reduce the number of occurrences of IDDM and other autoimmune diseases also possibly triggered by BSA ingestion.

There is a reasonably strong correlation between high per capita milk consumption and the occurrence of IDDM. For example, IDDM is rare in Japan but common in Scandinavia. More than 90% of Japanese adults are lactose intolerant (LI) while fewer than 10% of Scandinavian adults have this genetic trait. The LI trait has a marked effect on human behavior. Specifically, individuals who are LI tend to drink less milk than those who do not have this genetic trait. Thus, per capita milk consumption in Japan is approximately 1/10th that of Scandinavia, and this fact suggests why IDDM is less than 1/10th as common among the largely LI Japanese population.

Australian aborigines are another group of people who typically avoid milk due to genetic LI. A study of almost 9,000 aboriginal children failed to identify a single case of IDDM. More than 20 cases would be expected if aboriginal children had the same risk of IDDM as American children.

As previously stated, nearly all cases of IDDM result from the destruction of insulin producing cells by a person's own immune system. Some studies suggest that this destruction is triggered by exposure to BSA from cows' milk in individuals genetically susceptible to IDDM. In recent research on IDDM in high-milk-use nations, all 521 people studied had anti-BSA antibodies. The 142 people with newly diagnosed IDDM had anti-BSA antibody levels nearly 7 times higher than the 379 people without IDDM. In children with newly diagnosed IDDM, anti-BSA antibodies were found to cross react with a protein found in pancreatic beta-cell membranes. This protein found in pancreatic beta-cell membranes has the same molecular weight as BSA. In light of the matching molecular weights, it may be that this unknown protein is actually BSA, an ingested protein from cows' milk that has been incorporated into the cell membrane of human beta-cells because of the similarity between BSA and human serum albumin (HSA), a protein normally ingested by human cells. BSA molecules, which act as foreign proteins on human beta-cells, provoke repeated immunologic attacks from white blood cells in the pancreas. White blood cells function as a sort of "policeman of the body". They seek out and attack BSA and other foreign proteins. Consequently, as human white blood cells destroy BSA molecules on the pancreatic beta-cell surfaces, the beta-cells themselves are inadvertently killed, and when enough beta-cells are destroyed, clinical IDDM results. There is also evidence that similar autoimmune attacks directed against other human cells may be responsible in part for the development of atherosclerotic vascular disease, myasthenia gravis, multiple sclerosis, pernicious anemia, and other human autoimmune diseases.

Albumin is found in the blood of all mammals, and a small amount is present in milk. About 1% of the protein in cows' milk is BSA; cheese has less BSA and whey has more. All forms of albumin and specifically BSA are heat liable. The rate of denaturation of BSA increases exponentially with increasing temperature.

With the above information in mind and upon investigation of current methods of milk processing, significant inadequacies are discovered in current methods. For example, pasteurization is a process in which heat is applied to milk in order to destroy unwanted microorganisms. During pasteurization, milk is heated to one of two typical pasteurization temperatures, namely 60 or 72 degrees Celsius. While pasteurization may be accomplished at these temperatures, no significant denaturation of BSA occurs. Consequently, it appears that the occurrence of IDDM and other autoimmune diseases is more likely for a person drinking pasteurized, BSA non-denatured milk, as opposed to the unique, new denatured BSA milk.

Milk can also be ultra-pasteurized (UP) by exposing it to 138 degrees Celsius for approximately 2 seconds. Ultra-high temperature (UHT) milk is sterilized by heating it to 142 degrees Celsius for approximately 6 seconds. UP milk is supposed to have an extended shelf life under refrigerated conditions while aseptically packaged UHT milk may be properly stored for extended periods of time in a non-refrigerated condition. Although both the UP milk and the UHT milk may typically have denatured BSA, by heating these types of milk at such relatively high temperatures, they lose important nutritional value and diminish their flavor as compared to regular pasteurized milk. In fact, it is common that both UP and UHT milk, as compared to the new denatured BSA milk, have 30% less of vitamin B1, 10% less of vitamin B2, 35–50% less of vitamin B6, 70–90% less of vitamin B12, and less of important other nutrients. In addition, the high processing temperatures required by both the UP and the UHT methods of milk production use relatively more energy, and the equipment required to produce these products is relatively expensive. Therefore, a need existed to provide a method for producing denatured BSA milk products that maintain both the maximum nutritional value and the optimum flavor of the milk while minimizing thermal inefficiency and maximizing cost effectiveness in such a process.

SUMMARY OF THE INVENTION

In accordance with one embodiment of this invention, it is an object of this invention to provide methods of producing denatured BSA milk products.

It is another object of this invention to provide denatured BSA milk products.

It is a further object of this invention to provide denatured BSA milk products without diminishing the flavor of these milk products.

It is yet another object of this invention to provide denatured BSA milk products without diminishing the nutritional value of these milk products.

It is a further object of this invention to provide denatured BSA milk products which reduce the likelihood of the development of Insulin Dependent Diabetes Mellitus (IDDM) in a person who consumes these milk products.

It is yet another object of this invention to provide denatured BSA milk products which may reduce the likelihood of the development of atherosclerotic vascular disease, myasthenia gravis, multiple sclerosis, pernicious anemia, and other human autoimmune diseases.

BRIEF DESCRIPTION OF THE PREFERRED EMBODIMENTS

In accordance with one embodiment of this invention, a method of producing denatured bovine serum albumin (BSA) milk products is disclosed comprising the steps of providing container means for containing the milk products, and heating the container means for a period of time and within a certain temperature range sufficient for producing the denatured BSA milk products without substantially diminishing the milk products' flavor and nutritional value.

In accordance with another embodiment of this invention, a method of producing denatured bovine serum albumin (BSA) milk products is disclosed comprising the steps of providing container means for containing the milk products, and heating the container means for a period of time of about 90 seconds at an approximate temperature of 94 degrees Celsius for producing the denatured BSA milk products without substantially diminishing the milk products' flavor and nutritional value.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENT

As one of the main objectives of the method for producing denatured BSA milk products is to denature BSA in order to reduce the likelihood of the occurrence of IDDM and other autoimmune diseases, explanations of BSA and denaturation follow:

BSA is a complex organic molecule containing several thousand atoms composed of carbon, oxygen, hydrogen, nitrogen, and sulfur. BSA is a globular protein comprised of a single chain of 582 amino acids. The currently accepted sequence of the amino acids comprising BSA is provided in the formula define by sequence ID. No: 1. Note that since this is the best model of BSA currently available, it is possible that the model may change without affecting the results of this new method for denaturing BSA in milk products. In this formula, each of the three letter groups represents an amino acid as identified on the list shown under 3 FCFR 1.822 (b) (2)

Chemical Structure of BSA

See Sequence ID. No: 1

DENATURATION:

Most protein molecules retain their biological activity or capacity to function only within a very limited range of temperature and pH. Exposure of protein molecules such as BSA to extremes of pH or temperature causes them to undergo changes known as denaturation in which the most visible effects in globular proteins are an increase in molecular diameter and a decrease in solubility in water. Many proteins undergo denaturation when heated over 50–60 degrees Celsius, and in addition, some denaturation occurs when they are cooled below 10–15 degrees Celsius. In the case of the new denatured BSA milk products, denaturation occurs between about 75–100 degrees Celsius.

Denaturation also causes proteins to lose their characteristic biological activity. For example, when enzymes are denatured, their ability to catalyze a specific chemical reaction is typically lost. Since the covalent type chemical bonds in the peptide backbone of proteins are not broken during denaturation, it appears that denaturation is due to the unfolding of the characteristic folded structure of the polypeptide chain in the native protein molecule. In the denatured state, the polypeptide chains are randomly and irregularly looped or coiled. Similarly, the 582 amino acids that comprise BSA form a folded globular protein which substantially resembles a football type shape. Upon denaturation of BSA, the typical folded shape changes to an unfolded structure resembling a random and irregularly looped or coiled chain of the 582 amino acids.

Figure 1:
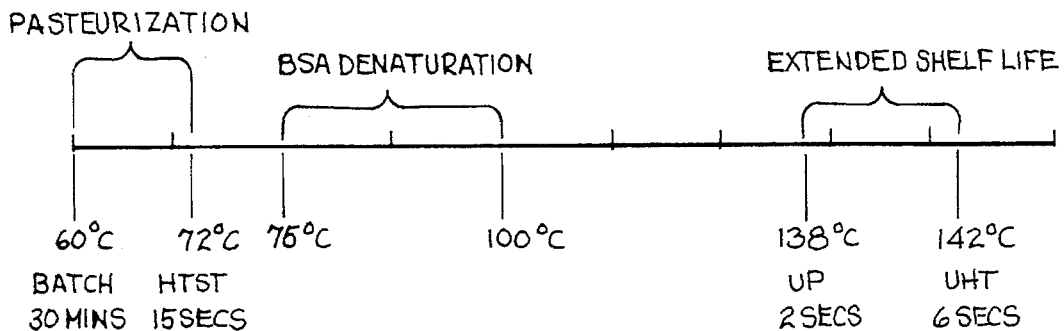
FIG. 1 shows typical temperature ranges used in the milk processing industry in addition to the new temperature range used to denature BSA in milk.

Referring to FIG. 1, a depiction of the various methods of milk production is shown. The process of pasteurizing milk is usually accomplished in one of two possible sets of time and temperature conditions, namely heating the milk for 30 minutes at 60 degrees Celsius or for 15 seconds at 72 degrees Celsius. At the lower of these two temperatures, the milk is processed as a batch. As an example, a large vat of milk could be heated for 30 minutes at 60 degrees Celsius. Alternatively, in high temperature short time (HTST) pasteurization, milk is passed through a 72 degree Celsius medium for 15 seconds. Less time is required to HTST pasteurize milk since the 72 degree temperature is hotter than the 60 degree batch processing temperature. Note that these time and temperature conditions for pasteurization do not denature BSA. The extended shelf life processes define an ultra-pasteurized (UP) milk and ultra-high temperature (UHT) milk. The UP process heats milk for 2 seconds at a temperature of 138 degrees Celsius, and the UHT process holds milk at 142 degrees Celsius for 6 seconds. Both processes denature BSA in milk, however, the nutritional value and the natural flavor of the final products are substantially reduced due to the high processing temperatures. The new denatured BSA milk products are pasteurized, fully flavorful and nutritious. These new BSA milk products are produced within time and temperature ranges of approximately 30 seconds to 60 minutes and about 75–100 degrees Celsius.

Figure 2:
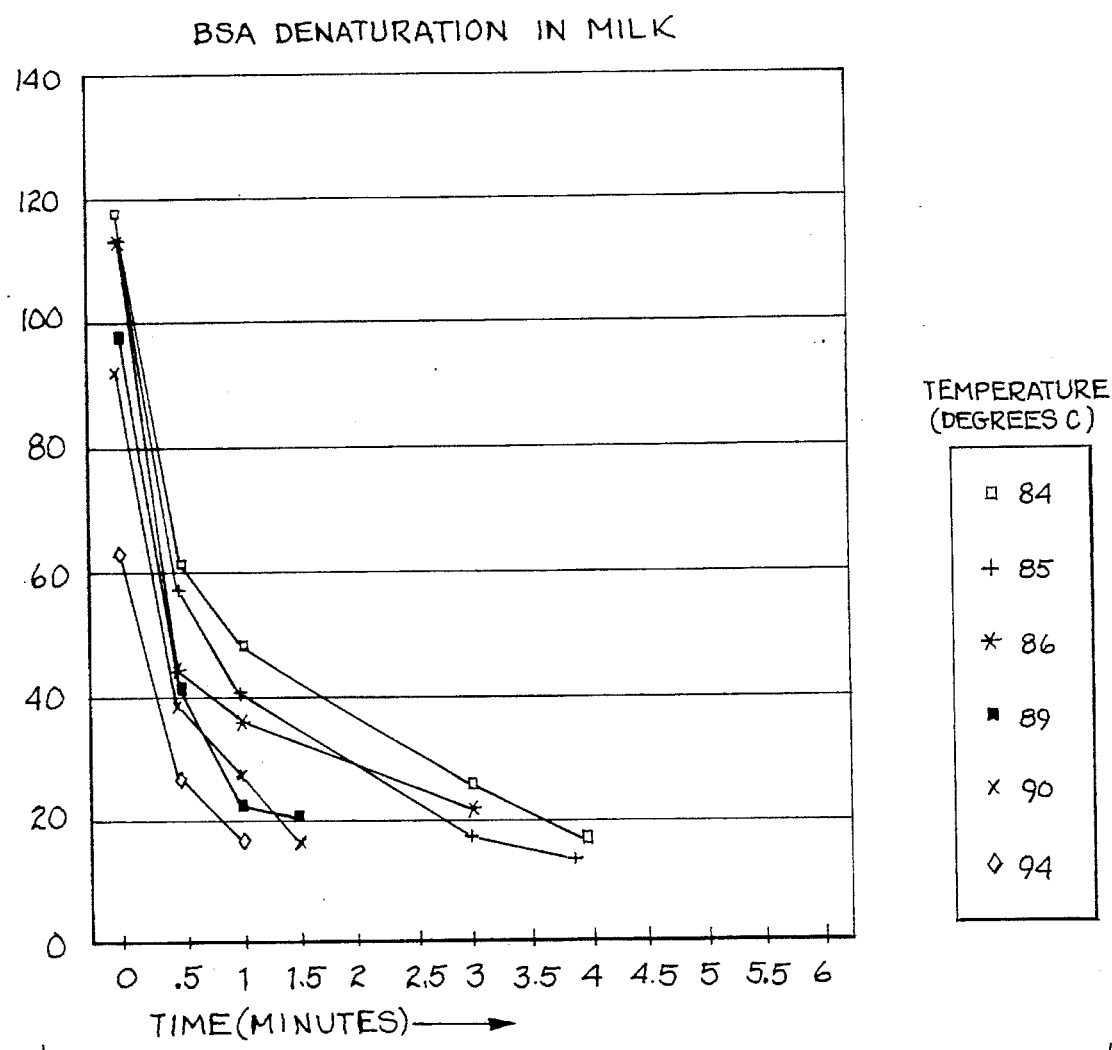
FIG. 2 is a plot showing the denaturation of BSA in milk as a function of time for several different temperatures between 84 and 94 degrees Celsius.
Figure 3:
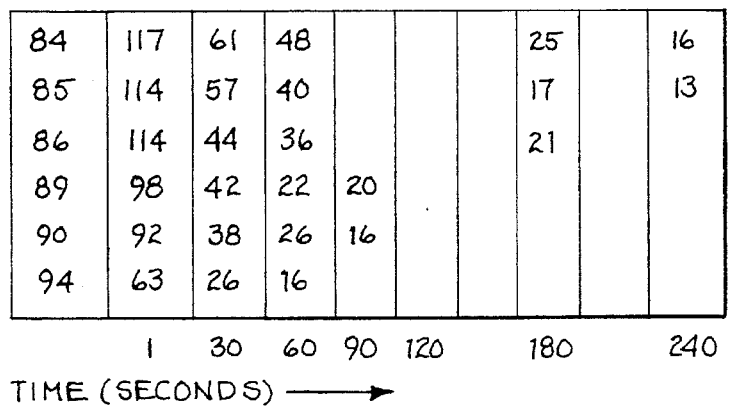
FIG. 3 is a table of the concentration of BSA (mg/L) in milk listed as a function of time for specific temperatures; this data was used to create FIG. 2.

Referring to FIGS. 2 and 3, a diagram of BSA concentration is plotted verses time for various temperatures within the range of 84–94 degrees Celsius. Note that the data from the table in FIG. 3 is the information which comprises the plots in FIG. 2. Also, note that BSA concentrations are not plotted below approximately 10–20 (mg/L) as this is the lower limit for the optimum detectability of BSA by radial immunodiffusion, the most accurate BSA detection method currently available. Therefore, in order to arrive at a BSA concentration of zero, an approximation such as a linear approximation could be made based upon the trend of the curves shown in FIG. 2.

Figure 4:
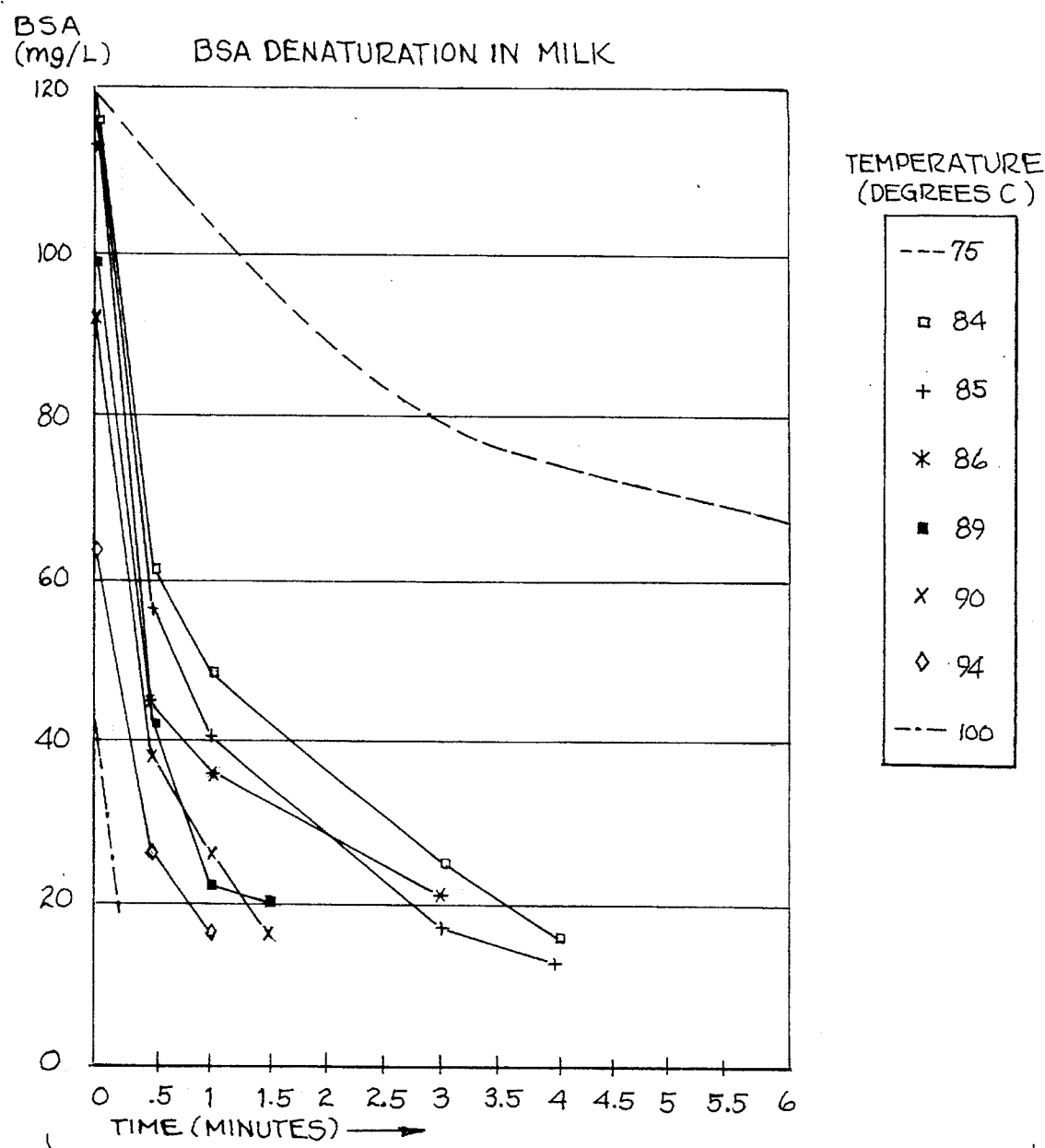
FIG. 4 is another plot showing the denaturation of BSA in milk as a function of time for several different temperatures between 75 and 100 degrees Celsius.

Referring to FIG. 4, a diagram of BSA concentration is plotted verses time for various temperatures within the range of 75–100 degrees Celsius. Again, note that BSA concentrations are not plotted below approximately 10–20 (mg/L) as this is the lower limit for the optimum detectability of BSA by radial immunodiffusion. Therefore, in order to arrive at a BSA concentration of zero, an approximation such as a linear approximation could be made based upon the trend of the curves shown in FIG. 4.

OPERATION

In general, the operation of this novel process requires that a milk product is contained in the proximity of a heat source which maintains a temperature between about 75–100 degrees Celsius for approximately 60 minutes to 30 seconds. Note that lower processing temperatures will require longer periods of time to denature BSA. If, for example, a lower processing temperature was being used, then a longer period of heating would be required. Consequently, the milk product might have to be held in a large container during the heating process. Alternatively, at higher processing temperatures, since less time is required to denature the milk product, a tube or some sort of coiled hose could be used to pass milk through a heated region provided that the milk product is at the required temperature for the required time. An optimum time and temperature condition for the production of denatured BSA milk products is about 90 seconds at approximately 94 degrees Celsius.

While the invention has been particularly shown and described with reference to the preferred embodiments thereof, it will be understood by those skilled in the art that the foregoing and other changes in form and details may be made therein without departing from the spirit and scope of the invention. For example, a variety of methods of containing and heating milk products may be used. In addition, denaturing globular proteins such as BSA is a function of not only time and temperature, but also pH, therefore, if desired, other methods of denaturing BSA in milk products could implement additional factors such as pH. Also, note that other mammals have albumin similar to bovine serum albumin, consequently, this process could be used to denature other sources of albumin such as from goats' milk or the milk of other mammals.

I claim:

1. A method of producing denatured bovine serum albumin (BSA) milk products comprising the steps of:

provide container means containing BSA milk products; and heating said container means and said BSA milk products for a period of time and within a certain temperature range sufficient for producing said denatured BSA milk products without substantially diminishing said denatured BSA milk products' flavor and nutritional value;

said certain temperature range is a temperature from about 75 degrees Celsius to about 100 degrees Celsius and said period of time is from about 30 seconds to about 60 minutes.

2. A method of producing denatured bovine serum albumin (BSA) milk products comprising the steps of:

providing container means containing BSA milk products; and heating said container means and said BSA milk products for a period of time and within a certain temperature range sufficient for producing said denatured BSA milk products without substantially diminishing said denatured BSA milk products' flavor and nutritional value; and wherein a temperature of approximately 75 degrees Celsius and a period of time of about 60 minutes is used.

3. A method of producing denatured bovine serum albumin (BSA) milk products comprising the steps of:

providing container means containing BSA milk products; and heating said container means and said BSA milk products for a period of time and within a certain temperature range sufficient for producing said denatured BSA milk products without substantially diminishing said denatured BSA milk products' flavor and nutritional value; and wherein a temperature of approximately 100 degrees Celsius and a period of time of about 30 seconds is used.

4. A method of producing denatured bovine serum albumin (BSA) milk products comprising the steps of:

providing container means containing BSA milk products; and heating said container means and said BSA milk products for a period of time and within a certain temperature range sufficient for producing said denatured BSA milk products without substantially diminishing said denatured BSA milk product' flavor and nutritional value; and wherein said certain temperature range is from about 84 degrees Celsius to about 94 degrees Celsius and said period of time is from about 1 minute to about 6 minutes.

5. The method of claim 4 wherein a temperature of approximately 84 degrees Celsius is used.

6. The method of claim 4 wherein a temperature of approximately 94 degrees Celsius is used.

7. A method of producing denatured bovine serum albumin (BSA) milk products comprising the steps of:

providing container means containing BSA milk products; and heating said container means and said BSA milk products for a period of time and within a certain temperature range sufficient for producing said denatured BSA milk products without substantially diminishing said denatured BSA milk products' flavor and nutritional value; and wherein a temperature of approximately 84 degrees Celsius and a period of time of about 6 minutes is used.

8. A method of producing denatured bovine serum albumin (BSA) milk products comprising the steps of:

providing container means containing BSA milk products; and heating said container means and said BSA milk products for a period of time and within a certain temperature range sufficient for producing said denatured BSA milk products without substantially diminishing said denatured BSA milk products' flavor and nutritional value; and wherein a temperature of approximately 94 degrees Celsius and a period of time of about 90 seconds is used.

9. A method of producing denatured bovine serum albumin (BSA) milk products comprising the steps of:

providing container means containing BSA milk products; and heating said container means and said BSA milk products for a period of time of about 90 seconds at an approximate temperature of 94 degrees Celsius for producing said denatured BSA milk products without substantially diminishing said denatured BSA milk products' flavor and nutritional value.

* * * * *

SEQUENCE LISTING ( 1 ) GENERAL INFORMATION:

( i i i ) NUMBER OF SEQUENCES: 1

( 2 ) INFORMATION FOR SEQ ID NO:1:

( i ) SEQUENCE CHARACTERISTICS:
        ( A ) LENGTH: 582
        ( B ) TYPE: amino acid
        ( C ) STRANDEDNESS: single
        ( D ) TOPOLOGY: linear ( x i ) SEQUENCE DESCRIPTION: SEQ ID NO:1:

```
Asp Thr His Lys Ser Glu Ile Ala His Arg Phe Lys Asp Leu Gly Glu
 1           .       5                  10                  15

Glu His Phe Lys Gly Leu Val Leu Ile Ala Phe Ser Gln Tyr Leu Gln
             20                  25                  30

Gln Cys Pro Phe Asp Glu His Val Lys Leu Val Asn Glu Leu Thr Glu
         35                  40                  45

Phe Ala Lys Thr Cys Val Ala Asp Glu Ser His Ala Gly Cys Glu Lys
     50                  55                  60

Ser Leu His Thr Leu Phe Gly Asp Glu Leu Cys Lys Val Ala Ser Leu
 65                  70                  75                  80

Arg Glu Thr Tyr Gly Asp Met Ala Asp Cys Cys Glu Lys Glu Gln Pro
                 85                  90                  95

Glu Arg Asn Glu Cys Phe Leu Ser His Lys Asp Asp Ser Pro Asp Leu
             100                 105                 110

Pro Lys Leu Lys Pro Asp Pro Asn Thr Leu Cys Asp Glu Phe Lys Ala
         115                 120                 125

Asp Glu Lys Lys Phe Trp Gly Lys Tyr Leu Tyr Glu Ile Ala Arg Arg
```

-continued

|     | 130 |     |     |     | 135 |     |     |     | 140 |     |     |     |     |
|-----|-----|-----|-----|-----|-----|-----|-----|-----|-----|-----|-----|-----|-----|
| His | Pro | Tyr | Phe | Tyr | Ala | Pro | Glu | Leu | Leu | Tyr | Ala | Asn | Lys | Tyr | Asn |
| 145 |     |     |     |     | 150 |     |     |     | 155 |     |     |     | 160 |

Gly Val Phe Gln Glu Cys Cys Gln Ala Glu Asp Lys Gly Ala Cys Leu
                165                 170                 175

Leu Pro Lys Ile Glu Thr Met Arg Glu Lys Val Leu Thr Ser Ser Ala
            180                 185                 190

Arg Gln Arg Leu Arg Cys Ala Ser Ile Gln Lys Phe Gly Glu Arg Ala
        195                 200                 205

Leu Lys Ala Trp Ser Val Ala Arg Leu Ser Gln Lys Phe Pro Lys Ala
    210                 215                 220

Glu Phe Val Glu Val Thr Lys Leu Val Thr Asp Leu Thr Lys Val His
225                 230                 235                 240

Lys Glu Cys Cys His Gly Asp Leu Leu Glu Cys Ala Asp Asp Arg Ala
                245                 250                 255

Asp Leu Ala Lys Tyr Ile Cys Asx Asx Glx Asx Thr Ile Ser Ser Lys
                260                 265                 270

Leu Lys Glu Cys Lys Asp Pro Cys Leu Leu Glu Lys Ser His Cys Ile
            275                 280                 285

Ala Glu Val Glu Lys Asp Ala Ile Pro Glu Asp Leu Pro Pro Leu Thr
290                 295                 300

Ala Asp Phe Ala Glu Asp Lys Asp Val Cys Lys Asn Tyr Gln Glu Ala
305                 310                 315                 320

Lys Asp Ala Phe Leu Gly Ser Phe Leu Tyr Glu Tyr Ser Arg Arg His
                325                 330                 335

Pro Glu Tyr Ala Val Ser Val Leu Leu Arg Leu Ala Lys Glu Tyr Glu
                340                 345                 350

Ala Thr Leu Glu Glu Cys Cys Ala Lys Asp Asp Pro His Ala Cys Tyr
            355                 360                 365

Thr Ser Val Phe Asp Lys Leu Lys His Leu Val Asp Glu Pro Gln Asn
    370                 375                 380

Leu Ile Lys Glx Asx Cys Asx Glx Phe Glu Lys Leu Gly Glu Tyr Gly
385                 390                 395                 400

Phe Gln Asn Ala Leu Ile Val Arg Tyr Thr Arg Lys Val Pro Gln Val
                405                 410                 415

Ser Thr Pro Thr Leu Val Glu Val Ser Arg Ser Leu Gly Lys Val Gly
            420                 425                 430

Thr Arg Cys Cys Thr Lys Pro Glu Ser Glu Arg Met Pro Cys Thr Glu
        435                 440                 445

Asp Tyr Leu Ser Leu Ile Leu Asn Arg Leu Cys Val Leu His Glu Lys
    450                 455                 460

Thr Pro Val Ser Glu Lys Val Thr Lys Cys Cys Thr Glu Ser Leu Val
465                 470                 475                 480

Asn Arg Arg Pro Cys Phe Ser Ala Leu Thr Pro Asp Glu Thr Tyr Val
                485                 490                 495

Pro Lys Ala Phe Asp Glu Lys Leu Phe Thr Phe His Ala Asp Ile Cys
                500                 505                 510

Thr Leu Pro Asp Thr Glu Lys Gln Ile Lys Lys Gln Thr Ala Leu Val
            515                 520                 525

Glu Leu Leu Lys His Lys Pro Lys Ala Thr Glu Glu Gln Leu Lys Thr
    530                 535                 540

Val Met Glu Asn Phe Val Ala Phe Val Asp Lys Cys Cys Ala Ala Asp
545                 550                 555                 560

```
Asp  Lys  Glu  Ala  Cys  Phe  Ala  Val  Glu  Gly  Pro  Lys  Leu  Val  Val  Ser
               565                      570                      575
Thr  Gln  Thr  Ala  Leu  Ala
               580
```